No. 780,137. PATENTED JAN. 17, 1905.
G. H. SMITH.
DEVICE FOR THINNING AND CULTIVATING BEETS.
APPLICATION FILED MAY 19, 1904.
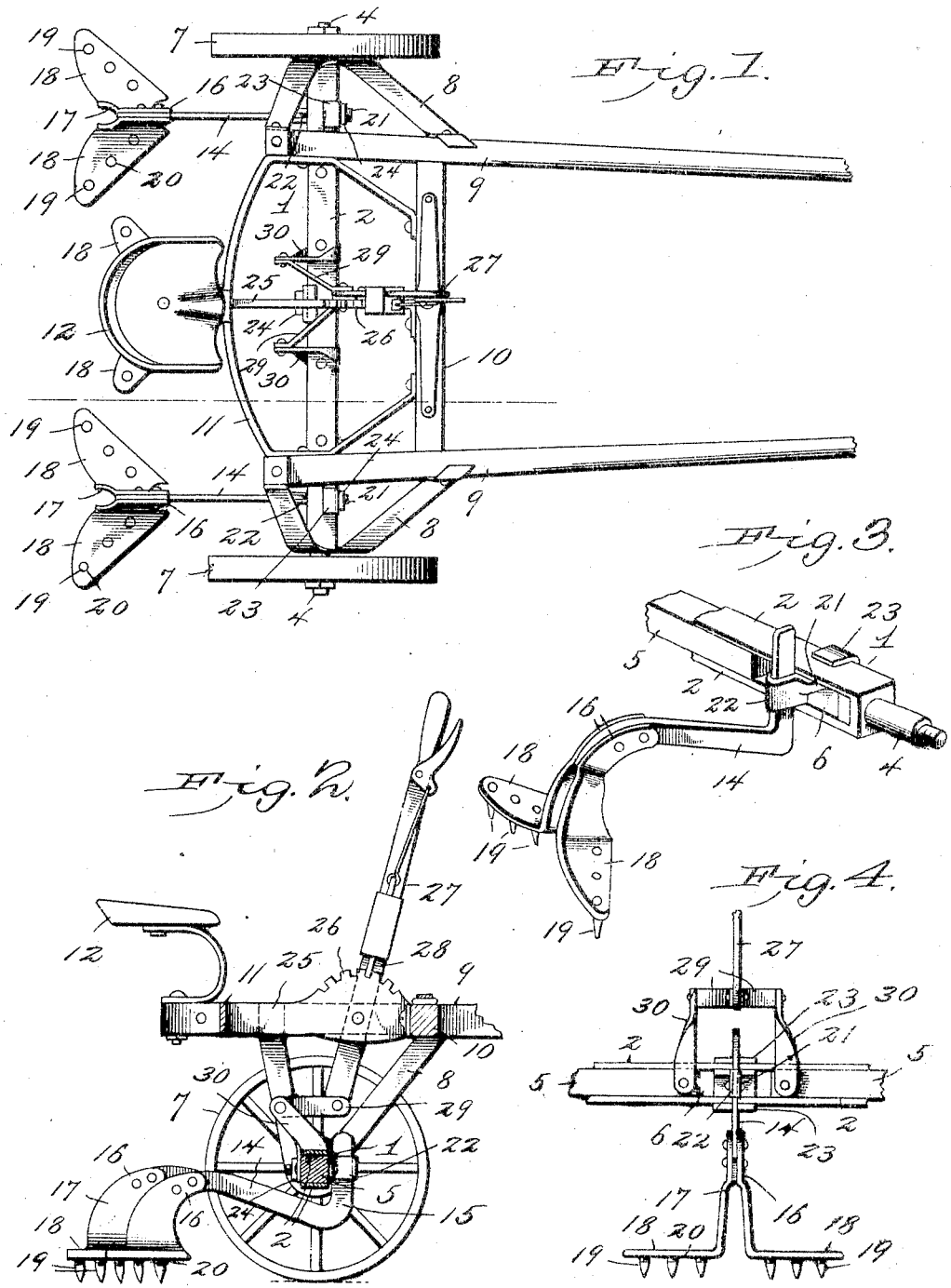
George H. Smith, Inventor.

No. 780,137.

Patented January 17, 1905.

UNITED STATES PATENT OFFICE.

GEORGE H. SMITH, OF URBANA, OHIO, ASSIGNOR OF ONE-HALF TO GEORGE E. McCONLEY, OF STERLING, COLORADO.

DEVICE FOR THINNING AND CULTIVATING BEETS.

SPECIFICATION forming part of Letters Patent No. 780,137, dated January 17, 1905.

Application filed May 19, 1904. Serial No. 208,735.

*To all whom it may concern:*

Be it known that I, GEORGE H. SMITH, a citizen of the United States, residing at Urbana, in the county of Champaign and State of Ohio, have invented a new and useful Device for Thinning and Cultivating Beets, of which the following is a specification.

This invention relates to devices for thinning or blocking out beets and other plants which are sown in drills and which after sprouting require to be thinned or blocked out in order that stands of a single plant each may be left at suitable distances apart to insure a healthy and prolific growth.

The present invention relates to that class of thinning devices which are designed to operate across the rows of plants for the purpose of thinning and at the same time cultivating the same, destroying grass and weeds; and it has for its object to provide a device of this class which shall possess superior advantages in point of simplicity, durability, and general efficiency and which shall be capable of being set or regulated in such a manner as to leave the stands at any desired distance apart and in which the earth-engaging implements shall also be capable of convenient adjustment.

With these and other ends in view the invention consists in the improved construction, arrangement, and combination of parts which will be hereinafter fully described, and particularly pointed out in the claims.

In the drawings hereto annexed has been illustrated a simple and preferred form of embodiment of the invention, it being, however, understood that I do not necessarily limit myself to the precise structural details therein exhibited, but reserve the right to any changes, alterations, or modifications which may be resorted to within the scope of the invention and without departing from the spirit or sacrificing any of the advantages of the same.

In said drawings, Figure 1 is a top plan view of a beet-thinning implement constructed in accordance with the principles of the invention. Fig. 2 is a side elevation, partly in section, of the same, the near wheel having been removed. Fig. 3 is a perspective detail view, partly in section and enlarged, of a portion of the axle and one of the thinning and cultivating implements. Fig. 4 is a sectional detail view taken longitudinally through the axle of the machine.

Corresponding parts in the several figures are indicated by similar numerals of reference.

In the form of embodiment of my invention, which is illustrated in the accompanying drawings, the axle, which is generally designated 1, is composed of top and bottom plates 2 2, suitably spaced apart at the ends thereof by blocks 3 3, carrying the spindles 4 4, and also spaced apart by intermediate blocks 5 5. The axle structure thus presents the appearance of being provided with a plurality of horizontally-disposed slots 6, which are bounded by the top and bottom plates, by the end blocks 3, and the intermediate blocks 5, and in the form of embodiment illustrated three such slots have been shown.

The spindles 4 carry the transporting-wheels 7, and upon said spindles adjacent to the inner sides of the transporting-wheels are mounted upwardly-extending bifurcated brackets 8 8, to the upper ends of which the shafts or thills 9 9 are secured, said thills being spaced apart not only by the usual cross-piece 10, but also by a metallic frame 11, supporting the seat 12.

The thinning and cultivating implements of the device are each provided with a beam 14, having at its front end an upwardly-extending bracket 15. At the rear end of each of the beams are secured a pair of downwardly-extending plates 16, which may be spaced apart by the thickness of the beam and which are shouldered or offset, as indicated at 17, for the purpose of spacing them sufficiently apart, and said plates are provided at their lowers ends with laterally-extending divergent wings 18, having downwardly-extending earth-engaging teeth 19, said teeth being secured detachably in screw-threaded sockets 20 in said wings in order that they may be readily detached for sharpening when necessary. It is obvious that any other suitable, well-known, and approved means for connecting the teeth detachably with the supporting-wings 18 may be resorted to within the scope of the invention. The depending plates 16, which carry the toothed wings 18, are spaced apart, as described, for the purpose of permitting the passage between them of the plant which is to be left to form the stand, and the distance between said plates may be regulated by the thickness of the beam 14 and by the extent of the shoulders or offsets 17. The wings 18 are preferably sharpened at their front edges, so as to constitute hoes which will effectively engage the soil to remove the growth in the path thereof.

The thinning and cultivating implements are connected with the axle of the device by means of clips or clamping devices, each of which includes a bolt member 21, having a slotted head 22 for the passage of the bracket 15, and a flange-plate 23, engaging the top and bottom plates of the axle and having a perforation for the passage of the bolt member, which is secured by means of a nut 24, clamped or tightened against the flanged clip-plate 23. By this simple clamping device the brackets of the thinning and cultivating implements may be securely connected with the axle laterally adjustably within the limit of the extent of the slots 6 and also vertically adjustably within the limits of the length of the brackets 15. By disposing the brackets 15 all adjacent to one side of the axle all of the earth-engaging implements will be disposed in lateral alinement with each other, assuming the devices to be all of equal dimensions. By disposing the brackets alternately adjacent to the front and rear sides of the axle the earth-engaging members will be disposed in zigzag order—that is, alternately in advance of and behind each other. This arrangement has been illustrated in the drawings and will preferably be carried out when a plurality of these earth-engaging implements are used. It is obvious that within the limits of the invention any desired number of these implements may be employed in a single machine.

The rear end of the frame 11 is connected by a longitudinal bar 25 with the cross-bar 10, carrying a rack-segment 26 and supporting a hand-lever 27, which is fulcrumed concentrically to the rack-segment and is provided with an ordinary spring-actuated dog 28, engaging the latter. The lower end of the lever is connected, by means of links 29, with uprights 30, rising from the axle. It will be seen that by manipulating the lever 27 the axle may be tilted, thereby raising or lowering the earth-engaging elements from or into engagement with the soil.

From the foregoing description, taken in connection with the drawings hereto annexed, the operation and advantages of this invention will be readily understood by those skilled in the art to which it appertains. The implement is driven across the field at right angles to the rows of plants, and the wings 18 of the thinning and cultivating implements will act as hoes to cut out the plants between the stands which pass between the plates 16, the latter serving as guards to prevent weeds or clods from falling upon the young plants and smothering their growth. The wings or hoes 18 will not only cut the superfluous plants, but also the weeds and grass growing adjacent to the stands, and the sharp teeth 19, digging into the soil, will remove the upturned roots of the grass and weeds, thus efficiently cultivating the ground as close to the stands as possible.

It is obvious that by properly adjusting the thinning and cultivating implements with relation to each other allowance may be made for elevating the stands at any distance apart. It is also obvious that by vertical adjustment of said implements they may be set to cut into the soil to any desired depth. By means of the lever 27 the axle may be tilted so as to throw the thinning and cultivating implements into or out of operative position, as may be required.

It is obvious that when desired the thills may be removed and a tongue be substituted, such tongue being suitably connected with the cross-piece 10, which latter will be connected with short frame-pieces substituted for the rear ends of the thills.

Having thus described my invention, I claim—

1. An axle composed of top and bottom plates, end blocks spacing said top and bottom plates apart and provided with spindles, intermediate spacing-blocks, wheels upon the spindles, and earth-engaging implements connected with the axle by clamping means extending through the slots or open spaces between the spacing-blocks.

2. An axle consisting of top and bottom plates separated by blocks spaced apart, earth-engaging implements having beams provided with upwardly-extending brackets and clamping means, including bolts provided with slotted heads for the reception of the brackets of the beams, clamping-plates perforated for the passage of said bolts, and tightening-nuts.

3. An axle consisting of top and bottom plates, blocks spacing said plates apart at the ends thereof and provided with spindles and intermediately-disposed spacing-blocks, in combination with earth-engaging implements having beams provided with upwardly-extending brackets and clamping means adjustably engaging said brackets, said clamping means being laterally adjustable in the slots between the spacing-blocks and the axle.

4. A wheel-supported axle, bifurcated brackets engaging the spindles of said axle and extending upward, thills supported by said brackets, a cross-bar and a seat-supporting frame spacing the rear ends of said thills, a longitudinal brace connecting the frame and cross-bar and having a rack-segment, a lever pivotally connected therewith and having a dog engaging the rack-segment, uprights rising from the axle, links connecting said uprights with the lower end of the lever, and earth-engaging implements connected with the axle.

5. A thinning and cultivating implement consisting of a beam, spaced plates depending from said beam and having shoulders or offsets for the passage between them of growing plants, and wings extending laterally from the offset portions, said wings constituting earth-engaging elements.

6. In a beet thinning and cultivating machine adapted to operate across the rows, the combination with a supporting-frame, of a thinning and cultivating implement including a beam, spaced plates depending from the rear end of said beam and having shoulders or offsets constituting guards for the growing plants that are to be left standing, and wings extending laterally from the lower ends of said shouldered portions and constituting earth-engaging elements.

In testimony that I claim the foregoing as my own I have hereto affixed my signature in the presence of two witnesses.

GEORGE H. SMITH.

Witnesses:
　Isaac N. Neese,
　Sam Stone, Jr.